United States Patent [19]

Morisot et al.

[11] Patent Number: 4,568,013
[45] Date of Patent: Feb. 4, 1986

[54] APPARATUS FOR SUPPORTING AND MOVING TOOLS FOR FIXING A CLUSTER OF TUBES TO A TUBULAR PLATE OF A STEAM GENERATOR

[75] Inventors: Michel Morisot, Saint-Leger-sur-Dheune; Roland Werle, Le Perray-en-Yvelines; Jean-Pierre Michaud, Clamart, all of France

[73] Assignee: Framatome & Cie, Durbevoie, France

[21] Appl. No.: 448,152

[22] Filed: Dec. 9, 1982

[30] Foreign Application Priority Data

Dec. 11, 1981 [FR] France ................. 81 23161

[51] Int. Cl.[4] .............. B23K 37/02; B24B 3/32; B23P 15/26
[52] U.S. Cl. ..................... 228/45; 51/411; 228/29; 228/18; 29/727
[58] Field of Search ........ 51/166 R, 166 TS, 166 FB, 51/410, 35, 417, 411, 420, 429; 29/157.4, 726, 727; 408/234, 235; 409/235, 237, 238, 241; 269/73; 248/650; 228/45, 29, 18

[56] References Cited

U.S. PATENT DOCUMENTS

| 3,214,867 | 11/1965 | Henning | 51/411 |
| 3,564,971 | 2/1971 | Wagner | 409/241 |
| 3,835,587 | 9/1974 | Hall, Jr. | 51/420 |
| 4,229,908 | 10/1980 | Panzeri | 51/165.93 |
| 4,232,442 | 11/1980 | Brunaud | 29/727 |

Primary Examiner—Frederick R. Schmidt
Assistant Examiner—Robert A. Rose
Attorney, Agent, or Firm—Pollock, Vande Sande & Priddy

[57] ABSTRACT

An apparatus for supporting and moving tools for fixing a cluster of tubes to the tubular plate (2) of a steam generator, comprising a first running track (25), a carriage (26) movable on this track, a horizontally alignable support (39) resting on the carriage 26, a second running track (43) carried by the support (39) and perpendicular to the track (25), and at least one supporting structure (42) consisting of a base (45) movable on the second running track (43) and carrying a vertical column (46), a tool holder (54) being mounted to move on the column (46) to offer a tool opposite each of the holes in the plate (2) in succession by virtue of a motor driven guiding and displacing elements (53-55) carried by the column (46) and of elements (31, 50,51) for moving the carriage (26) and the structure (42). The invention applies particularly to assembling the steam generator of pressurized-water nuclear reactors.

3 Claims, 9 Drawing Figures

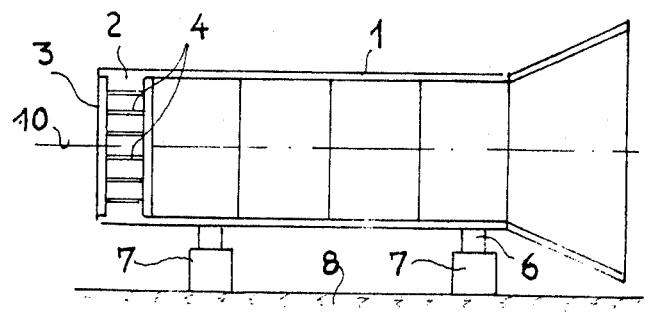
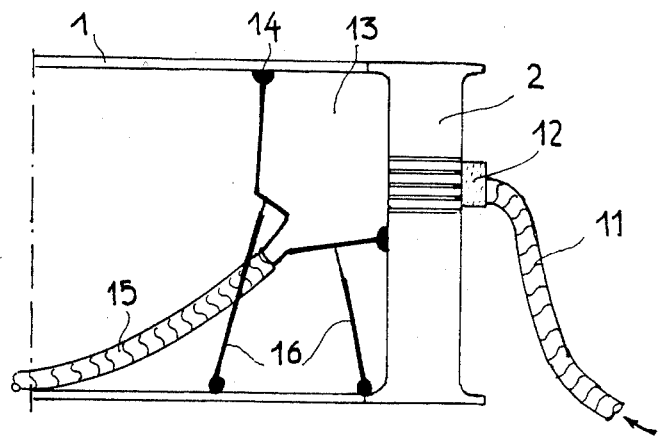
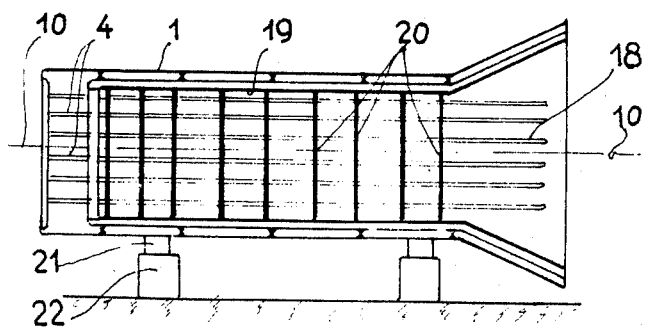
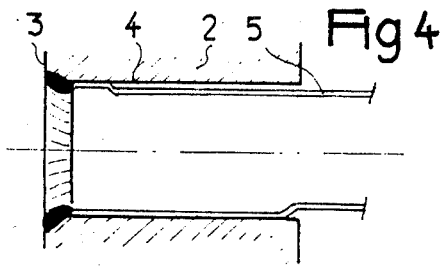
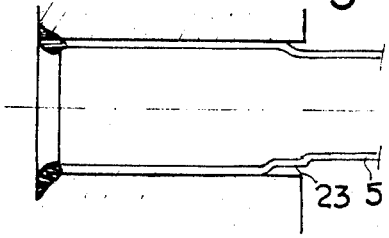

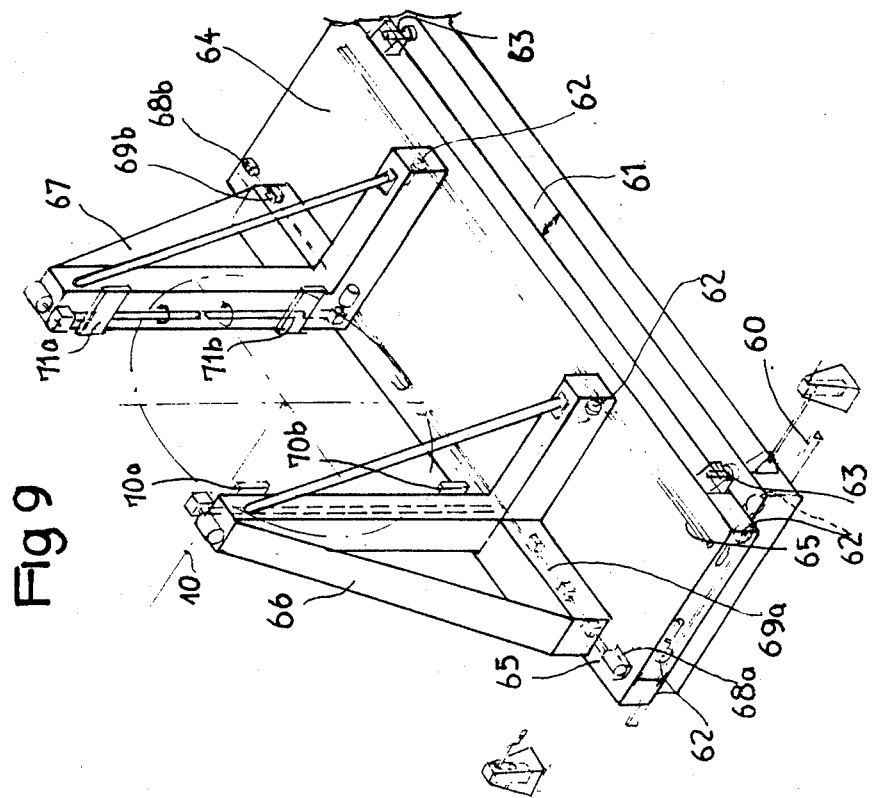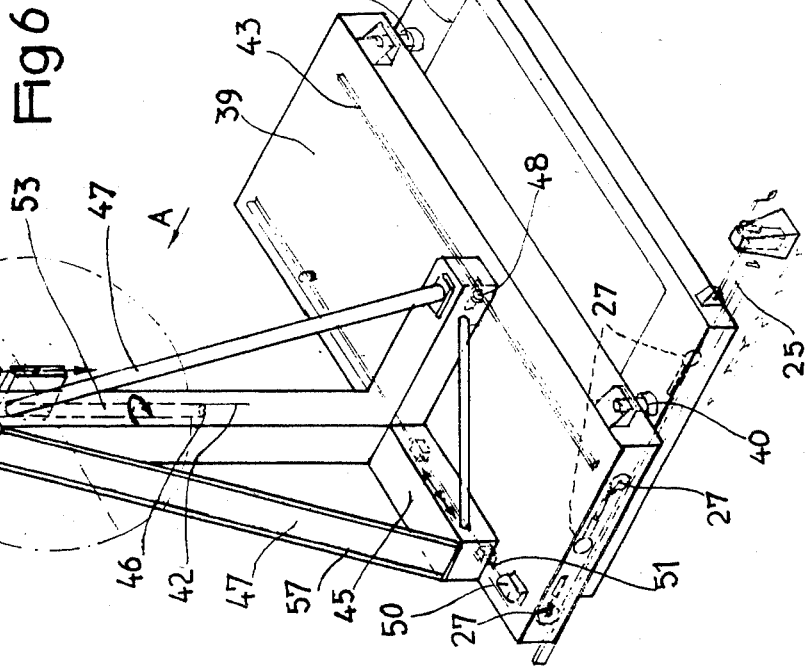

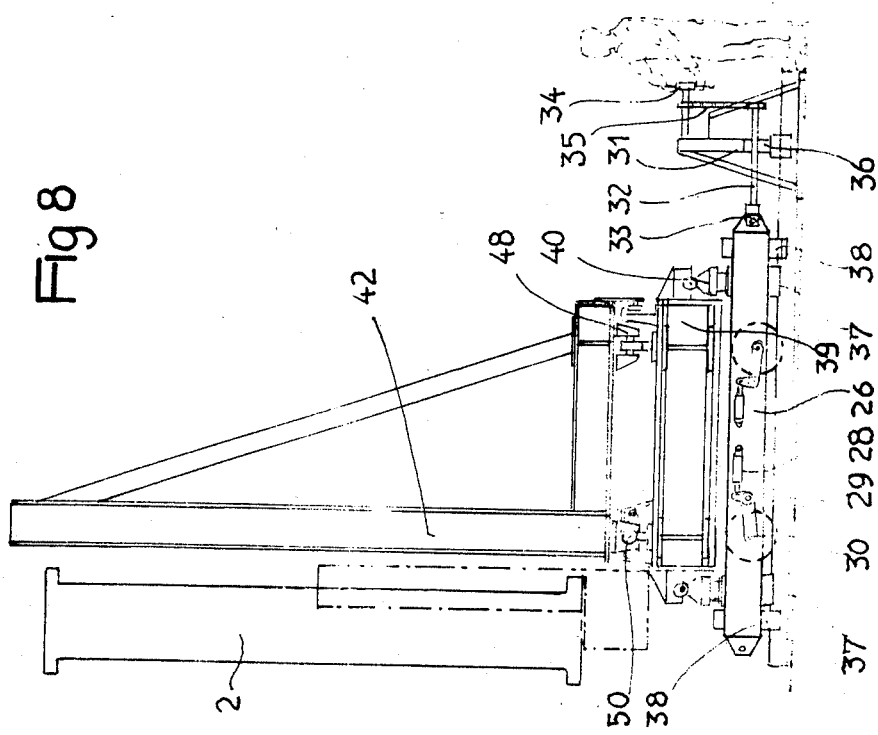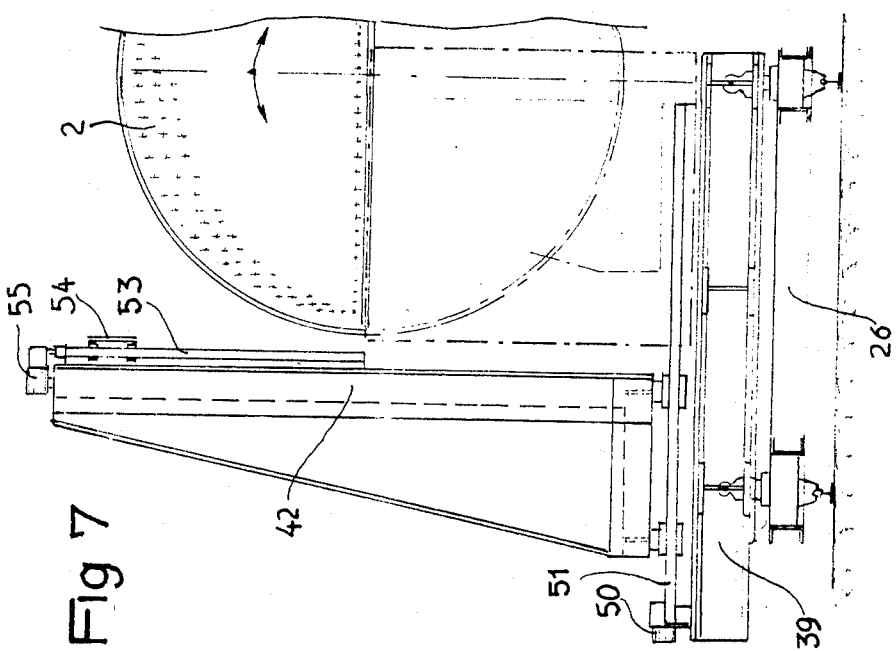

APPARATUS FOR SUPPORTING AND MOVING TOOLS FOR FIXING A CLUSTER OF TUBES TO A TUBULAR PLATE OF A STEAM GENERATOR

FIELD OF THE INVENTION

The invention relates to an apparatus for supporting and moving tools for fixing a cluster of tubes to the tubular plate of a steam generator of a pressurized-water reactor.

BACKGROUND OF THE INVENTION

Steam generators of pressurized-water nuclear reactors consist of a casing of great height of the order of 20 meters, the lower part of which encloses a cluster of tubes, fixed to a tubular plate, within which the pressurized water coming from the reactor vessel circulates from the bottom upwards and then from the top downwards, the tubes being bent, before it is returned to the vessel of the nuclear reactor. The supply water intended to produce the steam is introduced into the casing of the steam generator and comes in contact with the outer surface of the tubes of the cluster where it evaporates under the effect of the heat of the pressurized water circulating within the tubes of the cluster.

The upper part of the steam generator contains the water/steam separators and communicates with the circuit for processing and using the steam produced.

The tubular clusters of these steam generators comprise a very great number of tubes, for example of the order of 3000 in the case of steam generators of 900-Megawatt nuclear reactors constructed at the present time. These tubes are fixed by welding and then expanded at each of their ends onto a tubular plate of substantial thickness, one of the faces of which is in contact with the primary water which is distributed in the tubes in a compartment of a chamber consisting of two parts forming the lower end of the steam generator.

During the manufacture of the steam generator, the preparation of the holes in the tubular plate before installation of the cluster, as well as the expansion and degreasing of these tubes, are extremely long operations requiring very great care.

These operations are carried out in the workshop on the steam generator during assembly, the latter being maintained in a horizontal position on rollers allowing it to be rotated about its longitudinal axis arranged horizontally.

The cleaning of each of the holes in the tubular plate before installation of the cluster must be carried out by hand, and the work of the operators responsible for this cleaning is extremely laborious.

In the same way, the tubes have to be expanded within the tubular plate by operators using hand tools which have to be moved from one tube to the other over the entire tubular plate.

The expanding operation must be followed by an operation involving relaxing the stresses on the expanded tube at the level of the transition zone between the expanded part and the non-expanded part of the tube.

Finally, each of the tubes has to be degreased after expanding and stress removal.

There are known tools or devices which make it possible to carry out the various operations to prepare the plate and fix the cluster relatively quickly and automatically, but the movement of these tools from one hole to another in the tubular plate or from one tube to another in the cluster necessarily involves an operator, with the result that all the operations relating to a steam generator remain extremely lengthy and the manufacture of steam generators is still one of the operations which considerably slow down the manufacture of a nuclear reactor.

SUMMARY OF THE INVENTION

The purpose of the invention is, therefore, to propose an apparatus for supporting and moving tools for fixing a cluster of tubes to the tubular plate of a steam generator of a pressurized-water nuclear reactor, the steam generator being arranged, during assembly in the workshop, with its axis horizontal and its tubular plate vertical, and this apparatus is intended to make it possible to automate the operations for preparing the tubular plate and fixing the cluster, to reduce considerably the time needed for manufacturing the steam generator and to eliminate the laborious jobs to be carried out by hand on the tubular plate or the tubes of the cluster.

With this aim in view, the apparatus comprises:

a first horizontal running track placed on the floor of the workshop in the vicinity of the generator assembly station and parallel to the axis of this generator, a carriage movable on this running track between a position remote from the tubular plate and a position adjacent to the latter, a support resting on the carriage via means for adjusting its horizontal alignment, a second running track carried by the support and perpendicular to the running track of the carriage, at least one supporting structure consisting of a base movable on the second running track and carrying a vertical column, at least one toolholder mounted to move vertically on the vertical column so as to offer a tool successively at the level of each of the holes in the tubular plate by virtue of guiding and displacing means carried by the vertical column and of displacement control means, and means for moving the carriage and the supporting structure on their running tracks.

BRIEF DESCRIPTION OF THE DRAWINGS

To make the invention easy to understand, two apparatuses according to the invention, making it possible to carry out the various operations for fixing the cluster, will be described by way of example, with reference to the attached drawings. An operation for fixing the tubular cluster to the plate of a steam generator will also be described.

FIG. 1 shows, in a sectional view along a vertical plane, the lower part of the steam generator, on which the cleaning of the holes in the tubular plate is carried out.

FIG. 2 shows diagrammatically the equipment serving for the automatic cleaning of the holes of the steam generator.

FIG. 3 shows, in a sectional view along a vertical plane, the lower part of the steam generator during the expanding operation and stress removal on the tubes of the cluster.

FIG. 4 shows, in a sectional view on a large scale, the end of a tube engaged in the tubular plate before and after the expanding operation.

FIG. 5 shows, in a view identical to that of FIG. 4, the end of a tube engaged in the tubular plate before and after the operation of stress removal.

FIG. 6 shows, in a perspective view, an apparatus for supporting and moving a tool, making it possible to carry out the cleaning of the holes in the tubular plate and degreasing of the tubes.

FIG. 7 shows an elevation view of the apparatus and of the tubular plate in the direction of arrow A of FIG. 6.

FIG. 8 shows an elevation view in the direction of arrow B of FIG. 6.

FIG. 9 shows a perspective view of an apparatus for supporting and moving the tool, making it possible to carry out the expanding operation and stress removal on the tubes of the cluster of a steam generator.

DETAILED DESCRIPTION

FIG. 1 shows the lower part of the outer casing 1 of a steam generator of a pressurized-water nuclear reactor.

This outer casing consists of an assembly of cylindrical sleeves welded to one another and of a conical sleeve intended for connecting the lower part of small diameter of the steam generator to the upper part of larger diameter.

At its lower end, the casing is connected to the tubular plate 2 of substantial thickness intended to come in contact via its face 3 with the primary water filling a chamber limited by a hemispherical bottom forming the lower end of the steam generator.

The tubular plate 2 is perforated with a very large number of holes 4 over its entire thickness, that i.e., over a length greater than 50 centimeters.

After perforation these holes must be cleaned carefully before the tubes of the cluster are introduced.

For this purpose, the lower part of the steam generator is arranged at a cleaning station on rollers 6 which are themselves carried by supports 7 resting on the floor 8 of the workshop.

The rollers 6 make it possible to rotate the steam generator about its axis 10 positioned horizontally.

Referring to FIGS. 6, 7 and 8, an apparatus for support and movement according to the invention will be described which makes it possible to offer a tool for cleaning the holes opposite each of the holes in the tubular plate.

This equipment for automatically cleaning the holes is illustrated diagrammatically in FIG. 2 in the cleaning position on the tubular plate 2 of the steam generator in a horizontal position at its cleaning station.

This equipment comprises a shot-blasting head 12 fed by means of a flexible pipe 11 with compressed air containing, in suspension, shot consisting of microbeads of glass of a diameter of 150 to 250 microns.

An enclosure 13 for recovering the shot is retained in a leak-proof manner within the casing 1 of the steam generator by means of inflatable gaskets 14. This enclosure 13 is connected to a flexible pipe 15 for recovering the shot. Supporting legs 16 make it possible to maintain the recovery enclosure 13 in place.

The shot-blasting head 12 makes it possible to clean an assembly of holes, and the support and movement apparatus, to which the head 12 is fixed and which will be described with reference to FIGS. 6 to 8, makes it possible to move the head 12 from one position to another on the tubular plate 2 until such time as each of the holes in the plate has undergone cleaning by shot-blasting.

After shot-blasting, the holes are swept by a stream of air under pressure, allowing the elimination of particles of dust which may be present in these holes.

FIG. 3 shows the lower part of the generator in which the cluster 18 has been introduced, the inner casing 19 of the cluster and the retaining spacer plates 20.

The tubes are simply engaged into the tubular plate over the entire length of the holes 4 and are previously welded at their ends.

In FIG. 3, the lower part of the steam generator containing the cluster has been shown in its position at the expanding and stress removal station where this generator rests on rollers 21 placed on supports 22.

FIG. 4 shows a tube 5 located within a hole 4 in the tubular plate 2 and welded to the face 3 of the tubular plate 2 after the cluster has been installed.

The upper half-view shows the tube 5 in position in the hole 4 before the expanding operation, and the lower portion of FIG. 4 shows the tube after the expanding operation, i.e., after the crimping and rolling of the tube against the inner surface of the hole 4.

FIG. 5 shows, in the upper portion of the figure, the tube after the expanding operation, as shown in the lower portion of FIG. 4, and in the lower portion of FIG. 5 the tube 5 after the operation of stress removal on the transition zone 23 of this tube which is located between the expanded part and the non-expanded part of the tube in the vicinity of the face of the tubular plate 2 located on the secondary side of the generator.

This stress removal operation, the equipment for which was described in French Pat. No. 2,416,066 of Framatome, makes it possible, by eliminating the stresses in the transition zone, to reduce the susceptibility to corrosion under tension of the zone of the tubes located in the vicinity of the face of the tubular plate on the secondary side of the generator.

The operation of stress removal is carried out by equipment such as that described in French Pat. No. 2,416,066.

These expanding and stress removal operations are carried out by an assembly of tools carried by the support and movement apparatus such as that which will be described with reference to FIG. 9.

This assembly of tools carried by the apparatus illustrated in FIG. 9 makes it possible to carry out simultaneously the expanding and stress removal operations on adjacent holes and to move the tools automatically from one assembly of holes to another in the tubular plate. In this way, expanding and stress removal can be carried out on the tubular cluster much more quickly than when tools used manually by operators are employed.

To carry out the expanding and stress removal operations on the tubes, a small quantity of grease, intended to serve as a lubricant at the point of contact between the expander and the tube, is introduced into these.

After the operations of expanding and stress removal, it is necessary to carry out degreasing of the tubes, and for this purpose the apparatus for supporting and moving the tools, as illustrated in FIGS. 6 to 8, is used to change the position of a hot water injection nozzle so as to carry out degreasing by injecting hot water into each of the tubes in succession.

After hot water has been injected, the apparatus for supporting and moving tools is used to bring into a position opposite each of the tubes of the cluster an appliance for injecting floss for the drying and final cleaning of the degreased tube.

These operations can be carried out quickly by means of the apparatus for moving and positioning the tools opposite each of the ends of the tubes to be degreased.

The cycle of operations can be carried out automatically, thus increasing the rate of completion of the various operations and alleviating the work of the operator.

FIGS. 6, 7 and 8 show the apparatus for supporting and moving the tools, for cleaning by microbead blasting and blowing in air under pressure, and for the degreasing and final cleaning of the tubes.

The apparatus comprises a running track which consists of two rails 25 fixed to the floor of the workshop in the vicinity of the station for cleaning the tubular plate 2 and which is oriented in the direction of the axis 10 of the body of the steam generator.

A carriage 26 moves on the rails 25 by means of retractable wheels 27 when these wheels are put into the low position by means of jacks 28 acting on levers 29 engaged with the axle 30 of the wheel.

The carriage moveable on the rails 25 can be moved by the operator by means of a motion control device 31 illustrated in FIG. 8.

This motion control device consists of a drive screw 32 engaged in a connecting piece 33 which is fixed to the carriage and can be moved with translational motion by the operator by means of a handle 34, a drive chain 35 and a nut 36 which are fixed to the frame of the control device 31.

When the steam generator is in place on the roller supports 6, 7, as illustrated in FIG. 1, the tubular plate 2 is arranged vertically in front of the running track 25 of the carriage 26, as shown in FIG. 6.

The operator can then bring the carriage by hand into the working position in front of the tubular plate. The wheels of the carriage 26 are then retracted by means of the jacks 28 and the levers 29, and the carriage rests on the support blocks 37. The position of the carriage is fixed by means of locking jaws 38.

The support 39 rests on the carriage 26 via vertically adjustable ball-and-socket supports 40.

The adjustable supports 40 make it possible to establish perfectly the horizontal alignment of the support 39 and the vertical alignment of the supporting structure 42 carried by the support 39.

Fixed to the support 39 is a running track consisting of rails 43 and a slide, the direction of which is perpendicular to the direction of the rails 25 located on the floor of the workshop.

The base 45 of the structure 42 made in the form of a trihedron rests on these rails 43 and the slide.

The base consists of two right-angled elements, both fixed to a vertical column 46, the assembly as a whole being made rigid by struts 47.

The base 45 carries wheels 48 moving on the rail 43 and ball runners. A motor 50 drives a screw 51 to rotate, making it possible to drive with translational motion the structure 42, the base of which carries a nut engaging with the screw 51.

The vertical column 46 carries a vertical adjustment screw 53 and a vertical rod for guiding a tool holder 54, as well as a motor 55 for driving the screw 53 to rotate. The screw 53 engages with a nut fixed to the tool holder 54, with the result that rotation of the screw 53 by means of the motor 55 makes it possible to move the tool holder 54 in a vertical direction.

The movement of the structure 42 on the rails 43 when the carriage 26 and the support 39 are in place in front of the tubular plate of the steam generator makes it possible to arrange the tool holder opposite a row of holes in the tubular plate, these holes being arranged in a square-meshed network.

The tool holder 54 supports the device, illustrated in FIG. 2, for microbead-blasting and blowing air under pressure, during the operation for cleaning the holes in the tubular plate.

This tool holder 54 carries the hot water injection nozzle and the floss injection device for the final cleaning of the tube during the degreasing operations after expanding and stress removal.

The displacements of the structure 42 and of the tool holder 54 are designed so that it is possible to sweep a quarter of the tubular plate as a result of these displacements.

These operations can be performed in succession over the four quarters of the tubular plate by rotating the steam generator about its axis 10 by means of the rollers supporting it.

FIG. 9 shows an apparatus for supporting and moving tools to perform the operations of expanding and stress removal on the tubes.

This apparatus has a general structure identical to the structure of the support and movement apparatus which has just been described and which is illustrated in FIGS. 6 to 8, except that it comprises two similar supporting structures which themselves support two tool holders, and that the travel of the tool holders is such that it is not necessary to rotate the steam generator during the expanding and stress removal operations.

This apparatus has running rails 60 fixed to the floor of the workshop at the level of the station for the expanding and stress removal of the tubes of the steam generator and parallel to the axis 10 of the latter.

A carriage 61 can run on these rails 60 by means of retractable wheels 62 and by means of a manual movement apparatus similar to the apparatus 31 shown in FIGS. 6 and 8. The carriage 61 supports, by means of adjustable ball-and-socket thrust-bearings 63, a support 64, the horizontal alignment of which can be adjusted by means of the adjustable thrust-bearings 63.

Fixed to the support 64 is a running track 65 on which two supporting structures 66 and 67 practically identical to the structure 62 can move. Motors 68a and 68b and screws 69a and 69b engaging respectively with a nut carried by the supporting structures 66 and 67 respectively make it possible for these structures to move on the running track 65.

Each of the supporting structures 66 and 67 carries on its vertical column an assembly of two screws and two vertical-guide rods making it possible to move two tool holders 70a, 70b, and 71a, 71b respectively in a vertical direction.

When the support and movement apparatus is in place at the station for expanding and stress removal of the steam generator, the vertical alignment of the vertical columns of the structures 66 and 67 is adjusted by means of the supporting thrust-bearings 63, so as to ensure perfect parallel alignment between these columns and the vertical face of the tubular plate.

Each of the tool holders 70 and 71 carries an expanding tool and a stress removal tool, and the distance between these corresponds to the spacing or to a multiple of the spacing between the holes in the tubular plate.

In this way, it is possible simultaneously to perform the expanding of the holes in the plate and the removal of stress from an adjacent hole on which expanding has already been carried out.

The apparatus illustrated in FIG. 9 therefore enables expanding and stress removal to be performed simultaneously on four tubes of the cluster.

The vertical movement of the tool holders allows this operation to be carried out from the outside towards the inside of the cluster along a vertical row of holes in the tubular plate.

The two supporting structures 66 and 67 are then moved by means of the motors 68a and 68b so as to make the travel of the tool holders coincide with a new row of holes in the tubular plate.

All the movements and operations of expanding and stress removal are controlled from a cabin where means for controlling the movement motors and the tools fixed to the tool holders are assembled.

This more complex structure allowing the simultaneous use of a large number of tools has been chosen for the expanding and stress removal operations so that these operations are performed in a time sufficiently short not to slow down the overall production of the steam generator.

Any number of tool holders can be associated with each of the supporting structures, and likewise any number of supporting structures can be provided so as to constitute a more complex apparatus making it possible to perform a greater number of operations simultaneously.

The invention applies to all cases where it is intended to fix quickly and automatically the cluster of tubes to a plate of large dimensions having a very large number of tubes on heat-exchange appliances such as steam generators of nuclear power stations.

We claim:

1. Installation for securing in place a bundle of tubes in a steam generator of a pressurized-water nuclear reactor comprising a tubular plate perforated with a plurality of holes each receiving an end portion of a tube of said bundle, comprising
    (a) a support for holding said steam generator in a horizontal position so that said tubular plate is in vertical position;
    (b) a first horizontal running track so disposed relatively to said support that its direction is perpendicular to said tubular plate on its support and its end in the vicinity of said tubular plate;
    (c) a carriage comprising wheels for moving on said running track, means for blocking said carriage in position on said running track and means for displacing said carriage between a position remote from said tubular plate and a position adjacent said tubular plate disposed on its supports;
    (d) said displacing means comprising a drive screw engaged in a connecting element fixed to said carriage for translational movement, said wheels being retracted when said carriage reaches a working position adjacent said tubular plate, and locking means being provided for fixing said carriage in said working position;
    (e) a second support resting on said carriage by the intermediary of vertically adjustable means for adjusting its angular position relatively to the horizontal plane;
    (f) a second horizontal running track carried by said second support and perpendicular to said first running track;
    (g) at least one supporting structure consisting of a base, comprising means for moving on said second running track and a vertical column bearing vertical guide means;
    (h) at least one tool holder comprising means complementary to said vertical guide means for vertically displacing tools from one hole in said tubular plate to another, thus sequentially securing said end portions of said tubes in said tubular plate, the displacement of said tools resulting from the combined displacement of said supporting structure and said tool holder parallel to the tubular plate.

2. Installation according to claim 1, comprising two supporting structures, means for moving said structures on said second running track (65) and two tool holders mounted for movement on each of said vertical columns of said two supporting structures (66 and 67).

3. Installation according to claim 1, wherein said support for said steam generator comprises means for moving said steam generator in rotation about its horizontal axis.

* * * * *